(12) United States Patent
Anderson

(10) Patent No.: US 7,316,993 B2
(45) Date of Patent: Jan. 8, 2008

(54) COMBINATION CLEANING AND WAXING COMPOSITION AND METHOD

(76) Inventor: Leslie C. Anderson, 1065 W. 75 South, Clearfield, UT (US) 84015

( * ) Notice: Subject to any disclaimer, the term of this patent is extended or adjusted under 35 U.S.C. 154(b) by 365 days.

(21) Appl. No.: 11/051,207

(22) Filed: Feb. 5, 2005

(65) Prior Publication Data

US 2005/0148483 A1 Jul. 7, 2005

Related U.S. Application Data

(63) Continuation-in-part of application No. 10/651,312, filed on Aug. 28, 2003, now Pat. No. 6,992,051.

(51) Int. Cl.
*B05D 1/36* (2006.01)
(52) U.S. Cl. ..................... 510/205; 510/241; 510/466; 106/3
(58) Field of Classification Search ..................... None
See application file for complete search history.

(56) References Cited

U.S. PATENT DOCUMENTS

| 3,992,335 A | 11/1976 | Denissenko et al. |
| 4,952,248 A | 8/1990 | Aberg |
| 6,551,974 B1 | 4/2003 | Congrad et al. |

*Primary Examiner*—Gregory Webb
(74) *Attorney, Agent, or Firm*—Marcus G. Theodore

(57) ABSTRACT

A single step rub-on, rub-off combination cleaning and waxing composition particularly suited for automobiles, glass, plastics, fiberglass, tile, and floor coverings.

10 Claims, No Drawings

COMBINATION CLEANING AND WAXING COMPOSITION AND METHOD

RELATED APPLICATIONS

This application is a continuation-in-part application of the original patent application entitled "Combination Cleaning and Waxing Composition and Method" filed Aug. 28, 2003, Ser. No. 10/651,312 now U.S. Pat. No. 6,992,051.

BACKGROUND OF THE INVENTION

1. Field of Invention

The present invention relates to cleaning and waxing solutions. In particular, it relates to a single application rub-on, rub-off combination paint restorer, cleaner and waxing solution particularly suited for automobiles, glass, plastics, fiberglass, tile, and floor coverings.

2. Description of Related Art

Numerous cleaning and waxing solutions are known. Some of the more recently patented are: Denissenko et al, U.S. Pat. No. 3,992,335 discloses a self-shining floor care composition capable of rendering the surface of a substrate such as a wooden parquet floor shiny, without prior wax stripping and without subsequent polishing. It provides an anhydrous solution comprising of at least six and preferably seven constituents:

1. a solid, film-forming macromolecular compound,
2. a hard resin,
3. a liquid plasticizer,
4. a solid plasticizer,
5. a solvent mixture consisting of at least one lower alkanol and
6. a liquid co-solvent, and
7. an optional silicone oil.

Dinissenko et al is not adapted to restore oxidized painted surfaces of automobiles and other items before application. It therefore requires a paint restoration step before application.

Aberg, U.S. Pat. No. 4,952,248 discloses a method and apparatus for dry cleaning and shining of vehicles, especially motor vehicles and other waxable surfaces. The method includes the steps of applying a solution of ammonia, water and alcohol to the surface of the vehicle or other waxable surface, toweling the surface to spread the applied solution, partially remove and evaporate it to allow the alcohol to liquefy or soften the wax on the surface preparatory to finish polishing. It provides a chemical means for leveling the wax on the surface replacing mechanical buffing. The preferred solution includes 1½ ounces of commercially available ammonia preparation, 10 ounces of water and 4 ounces of isopropyl alcohol. Alternatively the solution includes 1½ ounces of ammonia with 6 ounces of water and 4 ounces of isopropyl alcohol (70% by volume), or mixtures within these ranges. Aberg also requires a prior paint restoration step to remove paint oxidation before applying a waxing mixture.

Conrad et al., U.S. Pat. No. 6,551,974 discloses a composition and method for use in imparting or maintaining a glossy or shiny finish on a hard surface. In one embodiment, the composition comprises a base polish component or components, and at least one poly[oxyalkyline] ammonium cationic surfactant, which provides an improved gloss or shine imparting properties. It is then applied to the hard surface. The poly[oxyalkyline] ammonium cationic surfactant comprises in the range of about 0.01 to about 10 wt. %, more preferably in the range of about 0.05 to about 5 wt. % and more preferably in the range of about 0.1 to about 1 wt. % of total composition. This composition preferably includes polishing agent abrasives to remove contaminants. These abrasives reduce the paint surface thickness and require extensive buffing for removal.

Other paint cleaning and waxing solutions require separate multiple sequential steps of the application and removal of paint restorers, and waxes.

The present invention described below provides an improved cleaning and waxing solution, which is applied in one application and simultaneously removes paint oxidation and applies a hard wax coating without the need for excessive buffing.

SUMMARY OF THE INVENTION

The present invention comprises a combination cleaner and waxing solution providing a one step paint restorer and wax applicator to impart a high gloss finish on a hard surface without extensive polishing. The composition comprises:

a. a paint sealant comprising 18-27% of the solution b. a clear coat cleaner comprising 18-27% of the solution c. a fast acting paint restorer comprising 18-27% of the solution d. a polymer paint sealant comprising 18-27% of the solution, and e. a velocity glaze comprising 5-10% of the solution.

The preferred paint sealant is produced by Sealtek International Corporation, S.R.I via Trevisan 7/A 35010 Vigongza PD, Italy known as Sealtek—ACR Paint Sealant 30008101 comprised of petroleum distillate, mild polishing agents, cleaners, and reactive silicones.

The preferred clear coat cleaner is Duz-All® clear coat cleaner oil base formula P-40, produced by BAF Industries Corporation a California, 1910 South Yale Street, Santa Ana, Calif. 92070. It is a mild cutting cream utilizing very fine polishing agents to gently clean every type of finish. It removes 100-1500 grit sanding scratches, acid rain damage, water spots, surface blemishes, fallout and light to medium oxidation for hand or machine use and contains no wax. It is comprised of silica, water (7732-18-5), diatomomite (61790-53-2), aliphatic petroleum distillate (64742-47-8), and pine oil (8001-09-3).

The preferred fast acting paint restorer is Auto Magic® Awesome Gloss produced by Auto Wax Company, Inc. 1275 Round Table Drive, Dallas, Tex. 75247. According to the manufacturer, it is a non-abrasive, premium polymer, which combines superior gloss enhancement with maximum durability. It has a quick dry formula, which does on like a wax, yet lasts like a sealant, which may be applied with an orbital buffer or a variable speed polisher. It contains water (7732-18-5), mineral spirits (64742-48-9), aluminum silicates (66402-68-4), silicone fluid (63148-62-9), and petroleum distillate.

The preferred polymer paint sealant is Pro Products® Polymer II Sealant produced by Pro Products, Inc., a California Corporation, 847 S. Wanamaker Avenue, Ontario, Calif. 91761, Item #P-39-1, which according to the manufacture is a liquid paint sealant which gives beautiful, long lasting protection to any finish and is fortified with Teflon® to reduce surface friction and is excellent for use on daily driven cars that need maximum protection from the elements. It contains paint sealant, architectural polymer resins, polytetrafluroethylene (PTFE), petroleum distillates, silica, CAS #7732-18-05, CAS #8052-41-3, CAS #66402-68-4, siloxane fluid mixture CAS #61790-12-3, and petroleum spirits.

The preferred velocity glaze is a speed hand wax-buffer high polish produced by P&S Sales, Inc. of 20943 Cabot Blvd, Hayward, Calif. 94545 called VELOCITY GLAZE #C13. According to the manufacturer, it quickly enhances and brightens paint finishes. Velocity Glaze features a unique luxurious lotion-like emulsion system designed for ease of application and dust-free product removal. This product may be used as a speed hand wax, orbital wax or DA machine polish in all detailing applications. They have formulated this product to be slightly moister to enhance dark or difficult to wax finishes. This product is perfect for use on all types of finishes including cars, trucks, motorcycles, boats and planes.

The first four components are admixed and form a clear solution. When the last velocity glaze component is added, a smooth creamy solution results containing paint sealant, architectural polymer resins, polytetrafluroethylene (PTFE) petroleum distillates, silica CAS #7732-18-5 CAS #8052-41-3 CAS #66402-68-4, siloxane fluid mixture CAS #617900-12-3, petroleum spirit, water (7732-18-5), Diatomite (61790-53-2), aliphatic petroleum distillate 64742-47-8), pine oil (8002-09-3), mineral spirits (64742-48-9), aluminum silicates (66402-68-4), mild polishing agents, cleaners, and reactive silicones.

The above chemical components have not previously been combined together as heretofore it has been thought that they were not chemically compatible or acted in a manner, which did not produce synergistic combined action.

The resultant cleaning and polishing solution, when friction applied to oxidized paint surfaces, results in surface changes, presumably caused by friction during the application of the product. The cleaning and polishing solution immediately softens and removes oxidized paint to expose the original paint. It is evenly applied and forms a wax like film after 15 to 20 seconds, depending upon weather conditions. The removed oxidized paint is embedded in the wax like film, and is then rubbed off to seal the original paint with a hard wax coating. The resultant hand rubbed hard wax finish is comparable to those acquired from multi-step operations involving oxidized paint removal, wax application, and machine buffing. To polish a typical car with extensive corrosion, a single user can remove the oxidized paint and wax seal the paint in an hour and a half. No additional solutions are required to polish and buff the chrome and rubber fittings as these are also cleaned and sealed by the above solution.

It has also been found that the above cleaning and wax solution can be used to clean and polish floor coverings, bathroom wall tiles, fiberglass boats, chrome, glass/mirrors, countertops, audio compact discs and other articles where removal of minor scratches and a smooth hard surface is desired.

The present invention is therefore particularly adapted to restore and wax painted surfaces, leaving a hard coating with a single application and removal operation. Because of the number of chemical components, the exact cleaning and polishing mechanism is presently not known.

The above description and specification should not be construed as limiting the scope of the invention but as merely providing illustrations of some of the presently preferred embodiments of this invention. Thus, the scope of the invention should be determined by the appended claims and their legal equivalents rather than by the examples given.

I claim:

1. A combination cleaning and waxing CD and DVD restoration solution for damaged CD and DVD surface covering comprising:
    a. a paint sealant comprising 18-27% of the solution,
    b. a clear coat cleaner comprising 18-27% of the solution,
    c. a fast acting paint restorer comprising 18-27% of the solution,
    d. a polymer paint sealant comprising 18-27% of the solution, and
    e. a velocity glaze comprising 5-10% of the solution, which when mixed with the paint sealant, the clear coat cleaner, the paint restorer and the polymer paint sealant forms a smooth creamy composition for friction application to the damaged CD and DVD surfaces to cause surface changes immediately softening and removing oxidization from the surface covering and forming a wax like film filling scratches to seal the original surface covering and restore the surface reflecting properties of the damaged CD or DVD.

2. A combination cleaning waxing CD and DVD restoration solution according to claim 1, wherein the chemical components comprise paint sealant, architectural polymer resins, polytetrafluoroethylene (PTFE) petroleum distillates, silica CAS #7732-18-5, Stoddard Solvent CAS #8052-41-3, blend of anhydrous aluminum silicates CAS #66402-68-4, liquid siloxane mixture CAS #617900-12-3, petroleum spirit, water (7732-18-5), diatomaceous earth (61790-53-2), aliphatic petroleum distillate (64742-47-8), pine oil (8002-09-3), mineral spirits (64742-48-9), mild polishing agents, cleaners, and reactive silicones.

3. A combination cleaning waxing CD and DVD restoration solution according to claim 1, wherein the paint sealant comprises petroleum distillate, mild polishing agents, cleaners, and reactive silicones.

4. A combination cleaning waxing CD and DVD restoration solution according to claim 1, wherein the clear coat cleaner is comprised of silica, water (7732-18-5), diatomaceous earth (61790-53-2), aliphatic petroleum distillate (64742-47-8), and pine oil (8001-09-3).

5. A combination cleaning waxing CD and DVD restoration solution according to claim 1, wherein the fasting acting paint restorer is comprised of water (7732-18-5), mineral spirits (64742-48-9), aluminum silicates (66402-68-4), silicone fluid (63148-62-9), and petroleum distillate.

6. A combination cleaning waxing CD and DVD restoration solution according to claim 1, wherein polymer paint sealant is comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits.

7. A combination cleaning waxing CD and DVD restoration solution according to claim 1, wherein the velocity glaze comprises a speed hand wax-buffer high polish.

8. A combination cleaning waxing CD and DVD restoration solution according to claim 1 comprising:
    a. a paint sealant comprised of petroleum distillate, mild polishing agents, cleaners, and reactive silicones comprising 18-27% of the solution,
    b. a clear coat cleaner comprised of silica, water (7732-18-5), diatomaceous earth (61790-53-2), aliphatic petroleum distillate (64742-47-8), and pine oil (8001-09-3) comprising 18-27% of the solution,
    c. an fast acting paint restorer comprised of water (7732-18-5), mineral spirits (64742-48-9), aluminum silicates (66402-68-4), silicone fluid (63148-62-9), and petroleum distillate comprising 18-27% of the solution,
   d. a polymer paint sealant comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits comprising 18-27% of the solution, and
   e. a velocity glaze comprised of a speed hand wax-buffer high polish comprising 5-10% of the solution.

9. A method of making a combination cleaning and waxing CD and DVD restoration composition comprising:
   a. mixing together
      1. a paint sealant comprised of petroleum distillate, mild polishing agents, cleaners, and reactive silicones comprising 18-27% of the mixed solution weight
      2. a clear coat cleaner comprised of silica, water (7732-18-5), diatomaceous earth (61790-53-2), aliphatic petroleum distillate (64742-47-8), and pine oil (8001-09-3) comprising 18-27% of the mixed solution weight,
      3. a fast acting paint restorer comprised of water (7732-18-5), mineral spirits (64742-48-9), aluminum silicates (66402-68-4), silicone fluid (63148-62-9), and petroleum distillate comprising 18-27% of the mixed solution, and
      4. a polymer paint sealant comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits comprising 18-27% of the mixed solution to form a solution, and
   b. adding a velocity glaze comprised of a speed hand wax-buffer high polish comprising 5-10% of the mixed solution by weight until a smooth creamy composition results.

10. A method of cleaning and waxing damaged CD and DVD surfaces comprising:
   a. mixing together
      1. a paint sealant comprised of petroleum distillate, mild polishing agents, cleaners, and reactive silicones comprising 18-27% of the mixed solution weight with
      2. a clear coat cleaner comprised of silica, water (7732-18-5), diatomaceous earth (61790-53-2), aliphatic petroleum distillate (64742-47-8), and pine oil (8001-09-3) comprising 18-27% of the mixed solution weight,
      3. a fast acting paint restorer comprised of water (7732-18-5), mineral spirits (64742-48-9), aluminum silicates (66402-68-4), silicone fluid (63148-62-9), and petroleum distillate comprising 18-27% of the mixed solution, and
      4. a polymer paint sealant comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits comprising 18-27% of the mixed solution,
   b. adding a velocity glaze comprised of a speed band wax-buffer high polish comprising 5-10% of the mixed solution by weight to the above components until a smooth creamy composition results,
   c. friction applying the resultant creamy composition to the damaged CD or DVD surfaces to cause surface changes immediately softening and removing oxidization from the surface covering,
   d. allowing it to dry and form a wax like film, and
   e. removing the excess wax like film to fill scratches and seal the original surface covering and restore the surface reflecting properties of the damaged CD or DVD.

* * * * *